United States Patent
Connell et al.

(10) Patent No.: US 10,808,079 B2
(45) Date of Patent: Oct. 20, 2020

(54) SYNTHESIS OF COPOLYIMIDES CONTAINING FLUORINE AND SILICON SURFACE MODIFYING AGENTS

(71) Applicant: U.S.A. as represented by the Administrator of the National Aeronautics and Space Administration, Washington, DC (US)

(72) Inventors: John W. Connell, Yorktown, VA (US); Christopher J. Wohl, Jr., Portsmouth, VA (US); Jereme R. Doss, Hampton, VA (US); Allison M. Crow, Standford, CA (US); William T. Kim, Williamsburg, VA (US); Yi Lin, Yorktown, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 457 days.

(21) Appl. No.: 15/079,434

(22) Filed: Mar. 24, 2016

(65) Prior Publication Data

US 2016/0280858 A1 Sep. 29, 2016

Related U.S. Application Data

(60) Provisional application No. 62/139,209, filed on Mar. 27, 2015.

(51) Int. Cl.
*C08G 73/10* (2006.01)
*C08G 77/455* (2006.01)
(Continued)

(52) U.S. Cl.
CPC ......... *C08G 73/106* (2013.01); *C08G 73/105* (2013.01); *C08G 73/1039* (2013.01);
(Continued)

(58) Field of Classification Search
CPC ............ C08G 73/1039; C08G 73/1042; C08G 73/105; C08G 73/106; C08G 73/1082;
(Continued)

(56) References Cited

U.S. PATENT DOCUMENTS 3,325,450 A * 6/1967 Holub .................... C08G 77/00
 524/588
3,847,867 A 11/1974 Heath et al.
(Continued)

OTHER PUBLICATIONS

Akiyama, E., Takamura, Y. and Nagase, Y. (1992), Studies on silicone-grafted copolyimides, 4. Synthesis and properties of branching copolyimides with fluoroalkyl and poly(dimethylsiloxane) side chains. Makromol. Chem., 193: 2037-2047. doi:10.1002/macp.1992. 021930822 (Year: 1992).*

(Continued)

*Primary Examiner* — John D Freeman
(74) *Attorney, Agent, or Firm* — Jennifer L. Riley; Robin W. Edwards; Helen M. Galus

(57) ABSTRACT

Various embodiments provide random copolyimides that may possess the mechanical, thermal, chemical and optical properties associated with polyimides yet achieve a low energy surface. In various embodiments, the copolyimides may be prepared using a minor amounts of a diamino terminated fluorinated alkyl ether oligomer and a diamino terminated siloxane oligomer. The various embodiments include processes for making the copolyimides containing fluorine and silicon surface modifying agents and anisotropic coatings and articles of manufacture from them. Thus the coatings and articles of manufacture made with the copolyimides of the various embodiments may be characterized as having an anisotropic fluorine and silicon composition and low surface energy.

18 Claims, 8 Drawing Sheets

(51) Int. Cl.
*C09D 179/08* (2006.01)
*C08L 79/08* (2006.01)
*C09D 183/12* (2006.01)
*C08G 77/46* (2006.01)

(52) U.S. Cl.
CPC ..... *C08G 73/1042* (2013.01); *C08G 73/1082* (2013.01); *C08G 77/455* (2013.01); *C08G 77/46* (2013.01); *C08L 79/08* (2013.01); *C09D 179/08* (2013.01); *C09D 183/12* (2013.01)

(58) Field of Classification Search
CPC ....... C08G 77/455; C08G 77/46; C08L 79/08; C09D 179/08; C09D 183/12
See application file for complete search history.

(56) References Cited

U.S. PATENT DOCUMENTS

| | | | | |
|---|---|---|---|---|
| 4,421,820 A | * | 12/1983 | Varma | C07F 9/5537 428/367 |
| 4,520,075 A | * | 5/1985 | Igarashi | C08G 73/106 188/352 |
| 4,996,278 A | * | 2/1991 | Lee | C08G 73/106 522/176 |
| 5,144,078 A | * | 9/1992 | Nagase | C07C 217/76 528/125 |
| 5,637,772 A | * | 6/1997 | Malik | C07C 217/42 564/503 |
| 7,022,801 B2 | | 4/2006 | Medsker | |
| 2003/0092862 A1 | | 5/2003 | Thomas et al. | |
| 2004/0087759 A1 | | 5/2004 | Malik et al. | |
| 2012/0252968 A1 | * | 10/2012 | Wohl | C07D 305/08 524/600 |

OTHER PUBLICATIONS

Connell, John W., et al. "Synthesis and characterization of copolyimides containing fluorine and silicon surface-modifying agents." High Performance Polymers (2017): 0954008317698315. DOI: 10.1177/0954008317698315 (Year: 2017).*

* cited by examiner

SYNTHESIS OF COPOLYIMIDES CONTAINING FLUORINE AND SILICON SURFACE MODIFYING AGENTS

CROSS-REFERENCE TO RELATED PATENT APPLICATIONS

This patent application claims the benefit of priority to U.S. provisional patent application No. 62/139,209 entitled "Synthesis of Copolyimides Containing Fluorine and Silicon Surface Modifying Agents" filed Mar. 27, 2015, the contents of which is hereby incorporated by reference in its entirety.

STATEMENT REGARDING FEDERALLY SPONSORED RESEARCH OR DEVELOPMENT

The invention described herein was made in part by employees of the United States Government and may be manufactured and used by or for the Government of the United States of America for governmental purposes without the payment of any royalties thereon or therefore.

FIELD OF THE INVENTION

The present invention generally relates to copolyimides containing fluorine and silicon surface modifying agents having low adhesion surface properties and processes for making the same, as well as processes for making anisotropic coatings and articles of manufacture from the copolyimides containing fluorine and silicon surface modifying agents.

BACKGROUND OF THE INVENTION

Marine biofouling, insect adhesion on aircraft surfaces, microbial contamination of sterile environments, and surface particle contamination all present unique challenges. For example, adhesion of lunar dust to spacesuits and ground equipment during Apollo missions and concerns over insect residue adhesion to the leading edges of aircraft designed for laminar flow are challenges faced in design of space based equipment and aircraft. Specifically, insect residue adhesion to aircraft wings can present a problem since at certain minimum heights, it can disrupt laminar flow. Laminar flow is desirable for aircraft designs since it reduces drag and thus leads to better fuel efficiency which saves money on expenses such as fuel for the aircraft. Lunar dust (or other planetary dust) adhesion presents problems for space flight missions since lunar dust is very brittle and can damage equipment while also presenting a possible health hazard to astronauts. During the Apollo missions, lunar dust was unaccounted for and proved to be a significant problem when equipment such as visors and suits became damaged, and seals and rotating devices were compromised.

BRIEF SUMMARY OF THE INVENTION

Various embodiments provide copolyimides containing fluorine and silicon surface modifying agents (SMAs) that may possess the mechanical, thermal, chemical, and optical properties associated with polyimides, yet achieve a low energy surface. In various embodiments, copolyimides containing fluorine and silicon surface modifying agents may be prepared using a minor amount each of an amino terminated fluorinated oxetane derived oligomer and an amino terminated siloxane oligomer. In various embodiments, the fluorine containing alkyl ether oligomer segments and the siloxane oligomeric segments may be varied with respect to their molecular weights and relative concentrations.

Various embodiments may provide a copolyimide containing fluorine and silicon oligomer, processes for making the same, and/or articles of manufacture including the copolyimide containing fluorine and silicon oligomer, in which the copolyimide containing fluorine and silicon oligomer may be a reaction product of an amino terminated fluorine containing alkyl ether oligomer and an amino terminated siloxane oligomer. In various embodiments, the amino terminated fluorine containing alkyl ether oligomer may be a diamine terminated fluorine containing alkyl ether oligomer and the amino terminated siloxane oligomer may be a diamino organo siloxane oligomer. In various embodiments, the diamine terminated fluorine containing alkyl ether oligomer and the diamino organo siloxane oligomer may be reacted with a dianhydride. In various embodiments, the diamine terminated fluorine containing alkyl ether oligomer and the diamino organo siloxane oligomer may be reacted in the presence of one or more diamines. In various embodiments, the diamine terminated fluorine containing alkyl ether oligomer and the diamino organo siloxane oligomer may be reacted under condensation polymerization conditions to produce a precursor copoly(amide acid). In various embodiments, the precursor copoly(amide acid) may be soluble in one or more of an organic solvent. In various embodiments, the precursor copoly(amide acid) may be applied as a coating to a surface and then subjected to imidization conditions to form the copolyimide.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION OF THE INVENTION

Figure 1:
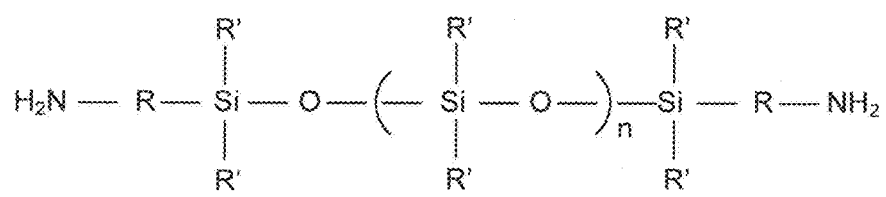
FIG. 1 illustrates a representative chemical structure of a diamino terminated siloxane oligomer suitable for use in the various embodiments.

For purposes of description herein, it is to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims. As used herein, the term "abhesive" means lack of adhesion (i.e., a non-stick surface), and the opposite of adhesion.

An array of mitigations strategies has been pursued to address the problems associated with marine biofouling, insect adhesion on aircraft surfaces, microbial contamination of sterile environments, and surface particle contamination. Passive strategies for minimizing fouling or contamination of surfaces are beneficial especially in environments where active mitigation of the fouling or contamination is impractical or impossible. For instance, lunar dust compromised seals, clogged filters, abraded visors and space suit surfaces, and was a significant health concern to astronauts during the Apollo missions. Accordingly, passive mitigation utilizing materials with an intrinsic resistance to surface contamination is advantageous for such applications.

Any surface material needs to meet the requirements of its application. High performance polymeric materials have been developed to address various requirements for mechanical, thermal, and optical properties. Modification of the chemical constituency of these polymeric materials can alter their properties. Thus, modification of high performance polymeric materials is often hampered due to degradation of the desired characteristic properties. Modifying a polymeric material where the properties of the surface are sought to be changed is problematic as addition of sufficient modifier to the bulk chemical composition to achieve the desired surface modification could also result in the diminution of important performance properties of the polymeric material. If the modifier is well dispersed within the polymer matrix, a majority of the modifier will be contained within the interior of the polymeric structure and will not contribute to modification of the structure's surface. This is of greater consequence if the modifier is expensive, provides no advantage, or diminishes bulk properties, of the polymeric material.

Polymeric materials with low adhesion surface properties have been demonstrated to be effective in a wide variety of applications. Low surface energy polymeric materials, i.e., those exhibiting a high water contact angle, have been used to reduce marine biofouling, water and ice adhesion, and biofilm formation; to improve oxidation, corrosion and stain resistance; to minimize dust adhesion; and to modify the performance of microfluidic systems and biomedical devices. The ability to selectively modify the surface energy of high performance polymeric materials without sacrificing their superior mechanical, thermal and optical properties would be of significant utility.

A number of approaches have been suggested to provide polymeric materials with low surface energy. One of the most well-known polymeric materials having low surface energy are fluorinated aliphatic polymers, such as those available under the trade name TEFLON® fluoropolymers. The presence of both aliphatic carbon species and fluorine atoms contributes to the low surface energy of this class of materials. These polymeric materials have an approximate homogeneous composition. These polymeric materials do not use a controlled modification and thus cannot be tailored for the introduction of further surface features. Moreover, they are difficult to adhere to substrates, and generally the polymer is provided as a powder to the substrate to be coated and sintered. Another approach is to vapor deposit highly fluorinated carbonaceous materials to various substrates.

Another approach to provide low surface energy polymeric materials is to incorporate surface modifying agents into the materials. These surface modifying agents are thermodynamically driven to the surface of the polymeric material due to more favorable interactions at the air interface as compared with interactions within the polymeric matrix.

Omnova Solutions, Inc. offers a family of hydroxy terminated oxetane-derived oligomers under the trade name POLYFOX® fluorochemicals and have found commercial application in polymeric systems. Fluorine-containing oxetane derivatives have been used as surface modification agents for modification of urethanes. For instance, U.S. Patent Application Publication No. US 2004/0087759 (incorporated herein by reference in its entirety) describes fluorine-containing oxetane derivatives used as surface modification agents for modification of urethanes. U.S. Pat. No. 7,022,801 (incorporated herein by reference in its entirety) and U.S. Patent Application Publication No. 2003/0092862 (incorporated by reference in its entirety herein) disclose the use of fluoro-containing oxetane polymers to impart wetting, flow, or leveling properties to a variety of coatings while producing little foam. U.S. Patent Application Publication No. 2012/0252968 (incorporated herein by reference in its entirety) discloses amino terminated fluorine containing oligomers and polyimides therefrom with low surface energy.

Polyimidesiloxanes derived from reactions of benzophenone tetracarboxylic dianhydride (BTDA) and alpha omega diamino organo-polysiloxanes are disclosed in U.S. Pat. No. 3,325,450 (incorporated herein by reference in its entirety). Polyimidesiloxanes containing an alpha omega diamino organo-polysiloxane and a diether dianhydride (DEDA) have also been disclosed in U.S. Pat. No. 3,847,867 (incorporated herein by reference in its entirety). These polymers may be of interest as coatings and dielectric layers in the fabrication of micro-electronic components. The polymers may also be of interest for wire and cable coatings and to prepare films, fibers, and molded and extruded articles.

Polyimides are known for their thermal stability, fire resistance, good chemical resistance, and excellent mechanical properties. Polyimides have good mechanical elongation and tensile strength and good adherence properties to many substrates. Some polyimides exhibit high optical clarity. Polyimides have found application as coatings, insulating films in the electronic industry, fibers and articles of manufacture including for demanding applications such as bushings, bearings in jet engines, or other constructive parts.

Accordingly, a desire exists to provide a polymeric material that has the mechanical, thermal, chemical, and optical properties associated with polyimides, yet achieves a low energy surface through surface chemical modification, topographical modification, or a combination of both.

Developing surfaces with desired properties has many practical applications making them of interest for many mission applications, such as insect abhesion for aircraft with laminar flow surfaces and planetary dust abhesion for space exploration missions.

These two specific cases, as well as other challenges, may be addressed by the various embodiments that may provide a passive method of mitigating particle and particulate adhesion. The embodiment passive approaches may not require external forces to achieve mitigation, making the various embodiment methods of mitigating particle and particulate adhesion self-sustaining.

The various embodiment methods of mitigation of surface adhesion to the undesirable species (e.g., insect residue, planetary dust, etc.) include the use of copolyimides with surface modifying agents (SMAs). The various embodiment approaches use chemistry to modify the surface characteristics of the polymers to minimize adhesion while at the same time maintaining the bulk properties of the polyimide. The various embodiments may achieve this by the use of the SMAs which may be designed to be thermodynamically drawn to the surface (air side) of the coating, and that have relatively low concentrations (e.g., 10% or less). In various embodiments, the SMAs may be reacted into the polymer backbone and thus may be chemically bound and cannot migrate or evaporate out of the coating. The embodiment copolyimides exhibit a combination of properties due to the novel approach and unique chemistry involved. Due to the use of the SMAs the surface properties of a coating prepared according to the various embodiments from these materials may exhibit a low surface energy which is desirable for anti-adhesion (abhesion) since the SMAs may preferentially migrate to the surface during the coating preparation process. The bottom-side of the coating, which may need to bond well to a substrate, may be relatively depleted of the SMAs, and thus the various embodiment coatings may stick well to a variety of surfaces including aluminum, plastics, and composites.

Various embodiments provide copolyimides containing fluorine and silicon SMAs that may possess the mechanical, thermal, chemical, and optical properties associated with polyimides, yet achieve a low energy surface. In various embodiments, copolyimides containing fluorine and silicon surface modifying agents may be prepared using a minor amount each of an amino terminated fluorinated oxetane derived oligomer and an amino terminated siloxane oligomer. In various embodiments, the fluorine containing alkyl ether oligomer segments and the siloxane oligomeric segments may be varied with respect to their molecular weights and relative concentrations.

Various embodiment coatings fabricated from the various embodiment copolyimides containing fluorine and silicon SMAs materials exhibit a low surface energy and unusual morphological characteristics based on the distribution of fluorine and silicon atoms on the surface. In some embodiment formulations, the silicon and fluorine containing segments unexpectedly phase segregate into Si and F rich domains. This in-turn may give rise to topographical features at the nanometer scale which may also influence the surface properties. The fluorine containing segments and the silicon containing segments of the embodiment copolyimides migrate to the exterior surface of the polymeric material and based on the resulting morphology may phase segregate to give low surface energies arising from both chemical and topographical contributions. In various embodiment copolyimide coatings and articles of manufacture, the surface may be saturated with both fluorine and silicon even at very low concentrations, e.g., below about 0.5 mass percent each. Although greater amounts of each SMA may be used, no further improvement in surface hydrophobicity may be observed. Hence, the embodiment copolyimides may be used to tailor the surface properties while still maintaining the bulk physical properties of the polyimide. The embodiment copolyimides may enhance the viability of polyimides for many applications and may be acceptable where homopolyimide materials have been unacceptable.

In the way of an overview, the various embodiment copolyimides may include divalent radicals of two oligomers, one a fluorine containing alkyl ether oligomer, such as one containing a perfluorinated carbon on a substituent on the beta carbon of the alkyl ether oligomer, and the other a siloxane oligomer, such as a dimethyl siloxane oligomer. In both cases, the molecular weight of the oligomers may be varied. The combined oligomer content of the copolymer may be less than about 10 or about 15, such as less than about 10, about 5, less than about 5, less than about 1, etc., based on the mass percent of the copolymer. In some embodiments, the combined oligomer content of the copolymer may be between about 0.001 and about 0.1, mass percent of the copolymer. In some embodiments, the water contact angle may be greater than about 85°, such as greater than about 90°. In some embodiments, concentrations higher than about 15 mass percent of combined oligomers may be used to make the copolyimides. Although at these high levels of combined oligomer content, physical properties of the embodiment copolyimide such as melting point, glass transition temperature, tensile strength, hardness and abrasion resistance may be inferior to the corresponding polyimide; however, the embodiment copolyimides may have low surface energy and in some instances, the embodiment copolyimides or embodiment precursor copoly(amide acid)s may be soluble in organic solvents such as dimethylacetamide, N-methyl-2-pyrrolidinone, acetone, methyl ethyl ketone (MEK), methyl propyl ketone (MPK), methyl amyl ketone (MAK) and tetrahydrofuran or any combinations thereof.

Various embodiments may use the amino terminated fluorine containing alkyl ether oligomers described in U.S. Patent Application Publication No. 2012/0252968. Various embodiments may use the amino terminated siloxane oligomers described in U.S. Pat. Nos. 3,325,450 and 3,847,867.

Various embodiments include copoly(amide acid)s and copolyimides containing the fluorine and silicon oligomers. The embodiment copolyimides may be prepared by using a combination of an amino terminated fluorine containing alkyl ether oligomer and an amino terminated siloxane oligomer with an aromatic dianhydride and another diamine in an organic solvent to produce a precursor copoly(amide acid). The embodiment copoly(amide acid) may be converted to the copolyimide by chemical means by treating with a dehydrating agent or thermally by heating to elevated temperature, such as under an inert atmosphere such as nitrogen or argon. The copolyimide may be a block co-polymer or a random co-polymer.

Various embodiments provide coatings having an outer surface and a bonding surface that comprise the embodiment copolyimides. The embodiment coatings may have an anisotropic distribution of fluorine and silicon atoms over its thickness with a higher concentration at the outer surface. Various embodiment coatings may have a water contact angle of at least 90° at the outer surface. The embodiment coatings may be on any suitable surface including metal, ceramic, glass, wood, paper, polymer, glass fiber reinforced composite, carbon fiber reinforced composite, or carbon nanotube reinforced composite surfaces. The embodiment coatings may be prepared by applying on a substrate a solution containing a embodiment copoly(amide acid) in a volatile solvent for the copoly(amide acid) to form a copoly (amide acid) coating, and then subjecting the copoly(amide acid) coating to drying and imidization conditions to form the anisotropic copolyimide coating.

Various embodiments include articles of manufacture comprising a fiber reinforced composite having an outer surface of an embodiment copolyimide wherein the article of manufacture has a higher concentration of fluorine and silicon atoms at its outer surface than that of the fiber reinforced composite substrate. The embodiment article may be made by casting, molding, extruding or other suitable process. For example, the article of manufacture may be made by forming an embodiment copoly(amide acid) into the shape of the article of manufacture and subjecting the article of manufacture to imidization conditions to form the article of manufacture. The embodiment copoly(amide acid) may be in a slurry or dissolved in a solvent when formed into the sought shape or may be in the form of a substantially dry particulate, e.g., having a major dimension of between about 20 and about 2000 microns. The embodiment particulate copoly(amide acid) may be formed into the sought shape under pressure and subjected to imidization conditions to form the copolyimide oxetane article of manufacture.

Various embodiments provide processes for making copoly(amide acid)s and copolyimides comprising reacting a diamine terminated fluorine containing alkyl ether oligomer and a diamino organo siloxane oligomer with at least one of a dianhydride of the formula $$O(C(O))_2\text{---}L\text{---}(C(O))_2O$$

wherein L is a hydrocarbyl containing moiety of 2 to 100 carbon atoms and optionally containing divalent radicals, such as one or more of oxygen, silyl, sulfur, carbonyl, sulfonyl, phosphonyl, perfluoro, tertiary amino, and amido, wherein the substitution of the anhydride groups relative to one another may be symmetric or asymmetric or a combination thereof. In various embodiments, the diamine terminated fluorine containing alkyl ether oligomer and the diamino organo siloxane oligomer may be reacted in the presence of one or more diamines of the formula $$\text{---NH---Z---NH---}$$

wherein Z is a hydrocarbyl-containing moiety of 1 to 100 carbon atoms optionally containing divalent radicals, such as one or more of oxygen, sulfur, silyl, carbonyl, sulfonyl, phosphonyl, perfluoro, tertiary amino, and amido, wherein the substitution of the amine groups relative to one another may be symmetric or asymmetric or a combination thereof.

In various embodiments, the diamine terminated fluorine containing alkyl ether oligomer and the diamino organo siloxane oligomer may be reacted under condensation polymerization conditions to provide the polyamic acid and the polyamic acid is subjected to imidization conditions, for example: 1) a thermal ring closure including a temperature of at least about 120° C., such as above about 120° C., between about 120° C. and about 400° C., between about 150° C. to about 400° C., about 400° C., etc., to provide the polyimide; or 2) a chemical ring closure in the presence of a dehydrating agent and ring-closing catalyst, such as one or more of pyridine, triethylamine, acetic anhydride, or the like, at a temperature in the range of about −20° C. to about 200° C.

Various embodiments may provide articles including coated substrates formed by coating a substrate or the article with copolyimides containing fluorine and silicon oligomers as described herein, such as coatings comprising a reaction product of a diamine terminated fluorine containing alkyl ether oligomer and a diamino organo siloxane oligomer of the various embodiments. In various embodiments, the coated substrate may be a portion of an article configured to have fluid flow over the coated substrate portion of the article. In various embodiments, the fluid may be water, air, or any other type fluid. In various embodiments, the article may be a self-contained article or a portion of a larger article, and example articles may include: a car, truck, train, or other land traversing vehicle; a boat, a submarine, or other water traversing vehicle; an airplane, a helicopter, or other air traversing vehicle; a window; a piling or other submersible construction component; a rocket, a satellite, an interplanetary vehicle, or other type spacecraft; etc.

Polyimides

Polyimides may be prepared by the reaction between a diamine and a dianhydride under condensation polymerization conditions. Additionally, polyimides may be prepared by a reaction of dianhydride and diisocyanate. The embodiment copolyimides may use as all or a portion of the diamine component a combination of diamines in which one may be a fluorine containing alkyl ether oligomer, such as one containing a perfluorinated carbon on a substituent on the beta carbon of the alkyl ether oligomer, and the other may be a siloxane oligomer, such as a dimethyl siloxane oligomer. Optionally, another aromatic diamine may also be used in the synthesis of the embodiment copolyimides.

In the various embodiments, the fluorine containing alkyl ether oligomer and the siloxane oligomer combined may constitute a minor portion by mass of the diamine components used in the synthesis, such as less than about 20 mass percent, such as less than about 10 mass percent, and such as between about 0.02 to about 0.5 mass percent of the total diamine where the properties of the copolyimide are sought. Generally, the amount of these two diamine terminated oligomers may be sufficient to provide a water contact angle of at least about 85° or greater, such as at least about 90°.

In the various embodiments, the diamino fluorine containing alkyl ether oligomer may be those described in U.S. Patent Application Publication No. 2012/0252968 and may be represented by the structure:

$$(E)_y R^1\text{---}C(O)\text{---}O\text{---}J\text{---}C(O)\text{---}R^1(E)_y$$

wherein J may be $[CH_2\text{---}CR^2R^3\text{---}CH_2\text{---}O]_m$ or $[(CH_2\text{---}CR^2R^3\text{---}CH_2\text{---}O)_p\text{---}(R^6\text{---}O)_q\text{---}(CH_2\text{---}CR^2R^3\text{---}CH_2\text{---}O)_r]$, wherein $R^6$ may be a substituted or unsubstituted aliphatic or aromatic moiety of 2 to 16 carbons, such as $CR^7CH_2\text{---}$, and wherein $R^7$ may be H or methyl. E may be $\text{---}NO_2$ or $\text{---}NH_2$, and for example, each E may be either $\text{---}NO_2$ or $\text{---}NH_2$. Additionally, y may be 1 or 2, and for example, each y may be 1. $R^1$ may be an aliphatic or aromatic hydrocarbon moiety of 1 to 10 carbon atoms, and optionally $R^1$ may be a divalent phenyl group. $R^2$ may be $\text{---}H$, $\text{---}F$, or an alkyl of 1 to 6 carbon atoms, such as an alkyl of 1 to 3 carbon atoms, and most often may be methyl. $R^3$ may be $\text{---}F$, $\text{---}R^4H_{(n-a)}F_a$, $\text{---}R^5\text{---}O\text{---}R^4H_{(n-a)}F_a$, or $\text{---}O\text{---}R^4H_{(n-a)}F_a$, wherein $R^4$ may be an alkyl or ether moiety of 1 to 30 carbons, $R^5$ may be an alkyl moiety of 1 to 30 carbons, a may be an integer of 3 to n, and n may be twice the number of carbon atoms in the alkyl moiety plus 1. Additionally, m may be between about 4 and 500, such as between about 6 and 100, p may be between about 4 and 150, q may be between about 1 and 150, such as between about 4 and 150. The omega carbon of $R^4$ may have three fluoride substituents. $R^5$ may be $\text{---}CH_2\text{---}O\text{---}C(R')_2\text{---}CF_3$, wherein R' may be $\text{---}H$ or $\text{---}F$, and r may be at least 1.

One or more diamino terminated fluorine containing alkyl ether oligomers may be contained in the copoly(amide acid)s and copolyimides of the various embodiments.

In various embodiments, the diamino terminated sioloxane oligomers may be those described in U.S. Pat. Nos. 3,325,450 and 3,847,867, and may be represented by the structure illustrated in FIG. 1, wherein R may be a divalent hydrocarbon radical, R' may be a monovalent hydrocarbon radical, and n may be a non-zero value, such as at least 1.

In the various embodiments, the optional diamine may be aliphatic or aromatic diamine and may include diamines containing other hetero atoms. One or more other diamines may be used. Examples of diamines suitable for use in the various embodiments may include aliphatic diamine such as trimethylenediamine, tetramethylenediamine, pentamethylenediamine, hexamethylenediamine, 2,2,4-trimethylhexamethylenediamine, 2,4,4-trimethylhexamethylenediamine, octamethylenediamine and nonamethylenediamine; and an alicyclic diamine such as bis(4-aminocyclohexyl)methane and bis(4-amino-3-methylcyclohexyl)methane; aromatic diamine, for example, phenylenediamine, diaminotoluene, 2,4-diaminomesitylene, 3,5-diethyl-2,6-diaminotoluene, xylylenediamine (in particular, metaxylylenediamine, paraxylylenediamine), bis(2-aminoethyl)benzene, biphenylenediamine, a diamine having a biphenyl backbone (e.g., 4,4'-diamino-3,3'-ethylbiphenyl), adiamine having adiphenyl alkane backbone [e.g., diaminodiphenylmethane, bis(4-amino-3-ethylphenyl)methane, bis(4-amino-3-methylphenyl)methane, 3,3'-dichloro-4,4'-diaminodiphenylmethane, 2,2'-bis(4-aminophenyl)propane], bis(4-aminophenyl)ketone, bis(4-aminophenyl)sulfone, or 1,4-naphthalenediamine, and an N-substituted aromatic diamine thereof; alicyclic diamine such as 1,3-cyclopentanediamine, 1,4-cyclohexanediamine, and bis(4-amino-3-methylcyclohexyl) methane; an aliphatic amine, such as trimethylenediamine, tetramethylenediamine, pentamethylenediamine, hexamethylenediamine, 2,2,4-trimethylhexamethylenediamine, 2,4,4-trimethylhexamethylenediamine, and octamethylenediamine, and an N-substituted aliphatic diamine thereof; and ether diamines such as poly(alkylene ether)diamines including poly(ethylene ether)diamine, poly(propylene ether)diamine, poly(tetramethylene ether)diamine; random or block copolymers of ethylene oxide and propylene oxide including propylene oxide and poly(propylene oxide) terminated poly (ethylene ether)diamine, 4,4'-oxydianiline; and aminated random or block copolymers of tetrahydrofuran with minor amounts of a second monomer such as ethylene oxide, propylene oxide, methyl tetrahydrofuran, bis[4-(3-aminophenoxy)phenyl]methane, bis[4-(4-aminophenoxy)phenyl] methane, 1,1-bis[4-(3-aminophenoxy)phenyl]ethane, 1,1-bis[4-(4-aminophenoxy)phenyl]ethane, 1,2-bis[4-(3-aminophenoxy)phenyl]ethane, 1,2-bis[4-(4-aminophenoxy) phenyl]ethane, 2,2-bis[4-(3-aminophenoxy)phenyl]propane, 2,2-bis[4-(4-aminophenoxy)phenyl]propane, 2,2-bis[4-(3-aminophenoxy)phenyl]butane, 2,2-bis[4-(4-aminophenoxy) phenyl]butane, 2,2-bis[4-(3-aminophenoxy)phenyl]-1,1,1, 3,3,3-hexafluoropropane, 2,2-bis[4-(4-aminophenoxy)phenyl]-1,1,1,3,3,3-hexafluoropropane, 4,4'-bis(3-aminophenoxy)biphenyl, 4,4'-bis(4-aminophenoxy)biphenyl, bis[4-(3-aminophenoxy)phenyl]ketone, bis[4-(4-aminophenoxy) phenyl]ketone, bis[4-(3-aminophenoxy)phenyl]sulfide, bis [4-(4-aminophenoxy)phenyl]sulfide, bis[4-(3-aminophenoxy)phenyl]sulfone and bis[4-(4-aminophenoxy) phenyl]sulfone.

Any suitable dianhydride or dianhydride combination may be used to make the embodiment copoly(amide acid)s and copolyimides and one or more dianhydrides may be used. Aliphatic and aromatic dianhydrides may be used in making the copoly(imide oxetane)s of the various embodiments. Examples of dianhydrides suitable for use in the various embodiments may include pyromellitic dianhydride (PMDA); 3,3',4,4'-biphenyl tetracarboxylic dianhydride (BPDA); 3,3',4,4'-benzophenone tetracarboxylic dianhydride (BTDA); 4,4'-oxydiphthalic anhydride (ODPA); 3,3', 4,4'-diphenylsulfone tetracarboxylic dianhydride (DSDA); 4,4'-(4,4'-isopropylidenediphenoxy)bis(phthalic anhydride) (BPADA); 2,3,6,7-naphthalene tetracarboxylic dianhydride; 1,2,5,6-naphthalene tetracarboxylic dianhydride; 1,4,5,8-naphthalene tetracarboxylic dianhydride; 2,6-dichloronaphthalene-1,4,5,8-tetracarboxylic dianhydride; 2,7-dichloronaphthalene-1,4,5,8-tetracarboxylic dianhydride; 2,3,3',4'-biphenyl tetracarboxylic dianhydride; 2,2',3,3'-biphenyl tetracarboxylic dianhydride; 2,3,3',4'-benzophenone tetracarboxylic dianhydride; 2,2',3,3'-benzophenone tetracarboxylic dianhydride; 2,2-bis(3,4-dicarboxyphenyl)propane dianhydride; 1,1-bis (2,3-dicarboxyphenyl)ethane dianhydride; 1,1-bis(3,4-dicarboxyphenyl)ethane dianhydride; bis (2,3-dicarboxyphenyl)methane dianhydride; bis(3,4-dicarboxyphenyl)methane dianhydride; 4,4'-(hexafluoroisopropylidene)diphthalic anhydride (6FDA); bis(3,4-dicarboxyphenyl)sulfoxide dianhydride; tetrahydrofuran-2,3,4,5-tetracarboxylic dianhydride; pyrazine-2,3,5,6-tetracarboxylic dianhydride; thiophene-2,3,4,5-tetracarboxylic dianhydride; phenanthrene-1,8,9,10-tetracarboxylic dianhydride; perylene-3,4,9,10-tetracarboxylic dianhydride; bis-1,3-isobenzofurandione; bis(3,4-dicarboxyphenyl)thioether dianhydride; bicyclo[2.2.2]oct-7-ene-2,3,5,6-tetracarboxylicdianhydride; 2-(3',4'-dicarboxyphenyl)5, 6-dicarboxybenzimidazole dianhydride; 2-(3',4'-dicarboxyphenyl) 5,6-dicarboxybenzoxazole dianhydride; 2-(3',4'-dicarboxyphenyl)5,6-dicarboxybenzothiazole dianhydride; bis(3,4-dicarboxyphenyl)2,5-oxadiazole 1,3,4-dianhydride; 2,5-(3',4'-dicarboxydiphenylether) 1,3,4-oxadiazole dianhydride; butane-1,2,3,4-tetracarboxylic dianhydride; pentane-1,2,4,5-tetracarboxylic dianhydride; cyclo butane tetracarboxylic dianhydride; cyclo pentane-1,2, 3,4-tetracarboxylic dianhydride; cyclohexane-1,2,4,5 tetracarboxylic dianhydride; cyclohexane-2,3,5,6-tetracarboxylic dianhydride; 3-ethyl cyclohexane-3-(1,2)5,6-tetracarboxylic dianhydride; 1-methyl-3-ethyl cyclohexane-3-(1,2)5,6-tetracarboxylic dianhydride; 1-ethyl cyclohexane-1-(1,2),3,4-tetracarboxylic dianhydride; 1-propylcyclohexane-1-(2,3), 3,4-tetracarboxylic dianhydride; 1,3-dipropylcyclohexane-1-(2,3),3-(2, 3)-tetracarboxylic dianhydride; dicyclohexyl-3,4,3',4'-tetracarboxylic dianhydride; 4,4'-bisphenol A dianhydride; 1,2,3,4-cyclobutanetetracarboxylic acid dianhydride; bicyclo[2.2.2]oct-7-ene-2,3, 5,6-tetracarboxylicdianhydride; hydroquinonediphthalic anhydride; ethyleneglycol bis(trimellitic anhydride); 9,9-bis-(trifluoromethyl)xanthenetetracarboxylic dianhydride (6FCDA); 9-phenyl-9-(trifluoromethyl)xanthenetetracarboxylic dianhydride (3FCDA); 9,9-diphenyl-2,3,6,7-xanthenetetracarboxylic dianhydride (PPXDA); 9,9-diphenyl-2,3,6,7-tetramethylxanthene (TMPPX); 9,9-diphenyl-2,3,6,7-xanthenetetracarboxylic bis (p-anisidylimide); 9,9-diphenyl-2,3,6,7-xanthenetetracarboxylic bis(butylimide); 9,9-diphenyl-2,3,6,7-xanthenetetracarboxylic bis(p-tolylimide); 9-phenyl-9-methyl-2,3, 6,7-xanthenetetracarboxylic dianhydride (MPXDA); 9-phenyl-9-methyl-2,3, 6,7-xanthenetetracarboxylic bis (propylimide); 9-phenyl-9-methyl-2,3,6,7-xanthenetetracarboxylic bis(p-tolyimide); 9,9-dimethyl-2,3, 6,7-xanthenetetracarboxylic dianhydride (MMXDA); 9,9-dimethyl-2,3,6,7-xanthenetetracarboxylic bis(propylimide); 9,9-dimethyl-2,3, 6,7-xanthenetetracarboxylic bis(tolylimide); 9-ethyl-9-methyl-2,3,6,7-xanthenetetracarboxlylic dianhydride (EMXDA); 9,9-diethyl-2,3,6,7-xanthenetetracarboxylic dianhydride (EEXDA); etc. Many of the above mentioned dianhydrides, if not all, may also be used in their "tetra-acid form" (or as mono, di, tri, or tetra esters of the tetra acid), or as their diester acid halides (chlorides). In some embodiments, the dianhydride form may be selected as it is generally more reactive than the acid or the ester.

In the various embodiments, the reaction may be conducted in the presence of one or more organic solvents for the dianydride and diamine. Example solvents suitable for use in the various embodiments include N,N-dimethylformamide, N,N-dimethylacetamide, N,N-diethylacetamide, N,N-dimethylmethoxyacetamide, N-methyl-2-pyrrolidone, 1,3-dimethyl-2-imidazolidinone, N-methylcaprolactam, 1,2-dimethoxyethane, bis(2-methoxyethyl) ether, 1, 2-bis(2-methoxyethoxy)ethane, bis[2-(2-methoxyethoxy)ethyl] ether, tetrahydrofuran, 1,3-dioxane, 1,4-dioxane, pyridine, picoline, dimethylsulfoxide, dimethylsulfone, tetramethylurea and hexamethylphosphoramide and mixtures thereof. The reaction temperature for the various embodiments may be between about 15° C. and about 75° C., such as less than about 50° C. The reaction may be carried out for the various embodiments under any pressure and ambient pressure may be satisfactory. The reaction time for the various embodiments may depend upon the reactive nature of the reactants, solvent, and reaction temperature. The reaction for the various embodiments may be continued for sufficient time to complete formation of a copoly(amic acid) which may be usually from about 0.1 to about 50 hours, such as about 2 to about 30 hours. The copoly(amic acid) of the various embodiments may be thermally imidized, resulting in the evolution of water, by heating, e.g. at a temperature of at least about 120° C., such as from about 150° C. to about 400° C., or chemically imized. The heating for the various embodiments may be conducted in the presence of an azetroping agent, such as toluene or xylene, to facilitate removal of the evolved water.

Figure 2:
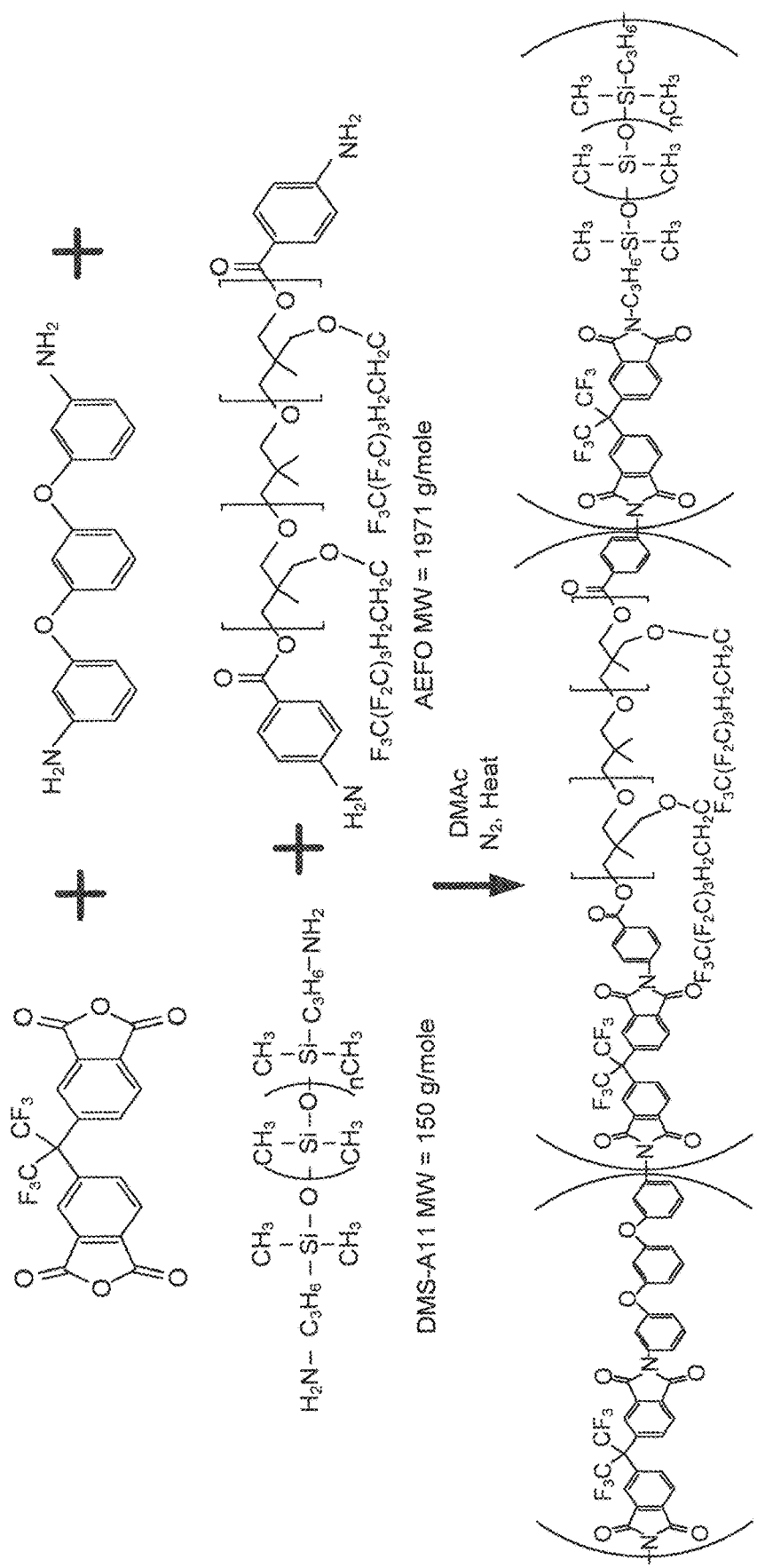
FIG. 2 illustrates an example scheme to represent the synthesis of random copolyimides according to the various embodiments.

An example scheme to represent the synthesis of random copolyimides according to the various embodiments is illustrated in FIG. 2. In FIG. 2, the intermediate copoly(amide acid) is not shown and the product shown is a representative structure of the random copolyimide.

The various embodiments may have many applications for coatings that prevent adhesion of a variety of contaminants on surfaces. The specific applications may dictate what other properties the embodiment coatings must have to be useful, such as optical transparency, weathering, stability, etc. The various embodiments may be discussed herein focused on coatings for aircraft, but the various embodiments may be applicable to other applications, such as space flight, marine fouling, and/or any application in which adhesion mitigation may be beneficial.

Experimental Results

A study of embodiment copolymides containing two SMAs was conducted.

Aminopropyl terminated polydimethylsiloxane (DMS-A11), N,N-dimethylacetamide (DMAc), and 1,3-bis (3-aminophenoxy) benzene (1,3-APB) were purchased from commercial sources and used as received. 3,3',4,4'-biphenyl tetracarboxylic dianhydride (s-BPDA) was purchased from UBE Industries Inc. and used as received. Amino Terminated PolyFox 7002 was synthesized following a published procedure. The molecular weight was determined using nuclear magnetic resonance (NMR) spectroscopy.

Contact angle goniometry data was collected using a First Ten Angstroms FTA 1000B contact angle goniometer available from First Ten Angstroms, Inc., Portsmouth, Va., United States. Sessile and tilting axis contact angles were measured for each sample using an 8 µL drop for water and ethylene glycol and a 2.5 µL drop for methylene iodide. Inherent viscosities ($\eta_{inh}$) were determined at 25° C. on the copoly (amide acid) solutions using an Ubbelohde viscometer and solution concentration of 0.5 g dL$^{-1}$. Differential scanning calorimetry (DSC) was conducted using a Setaram Instrumentation DSC 131 with a heating rate of 15° C./min over a temperature range of 30 to 300° C. Energy-dispersive X-ray spectroscopy (EDS) studies was conducted using a Thermo Scientific Noran System 7 X-Ray microanalysis system attached to a Hitachi S-5200 field emission scanning electron microscope (SEM). Samples were sputtered with a thin layer (~3 nm) of Au/Pd prior to analysis. The acceleration voltage during the analysis was 20 kV The EDS spectral acquirement and mapping were both conducted at Rate 5 as set by the instrument software, which has a maximal throughput of 227000 cps 30 frames at 10 s/f. Attenuated total reflectance infrared (ATR-IR) spectroscopy was used to confirm formation of copolyimides.

Stoichiometric equimolar amounts of aromatic diamine (1,3 APB), SMAs (A11 & PolyFox 7002), and aromatic dianhydride (s-BPDA) were used to create the copolyimides. Copolyimides were synthesized with varying percentages of SMAs to evaluate their effect on the mechanical properties, surface chemistry and surface energy. SMA mole percentages were 0.5% A11, 0.5% 7002; 1% Al, 1% 7002; 3% A11, 3% 7002; 5% A11, 5% 7002; 1% A11, 5% 7002; 3% A11, 5% 7002, and vice versa. A control polyimide was synthesized using equimolar amounts of 1,3-APB and s-BPDA for comparison. Reactions were carried out in a three neck 125 mL flask with a mechanical stirrer, nitrogen inlet, and drying tube. The reactions were designed to create four grams of polymer in a 20 wt. % solids solution in DMAc. The dianhydride and diamine components were weighed out and placed into the three neck flask along with the appropriate quantity of DMAc. The reaction was allowed to stir for at least one day at ~160 rpm. Inherent viscosities were determined at 25° C. on the poly(amide acid) solutions using an Ubbelohde viscometer and solution concentrations of 0.5 g/dL$^{-1}$. Films were cast on stainless steel plates using a doctor blade set to 20 mm and placed in an air drying chamber until tack-free. Films were then thermally imidized in a nitrogen oven using a cure cycle with a final stage at 250° C. for one hour. The films were then removed from the plates and used to perform various characterization tests.

Figure 3:
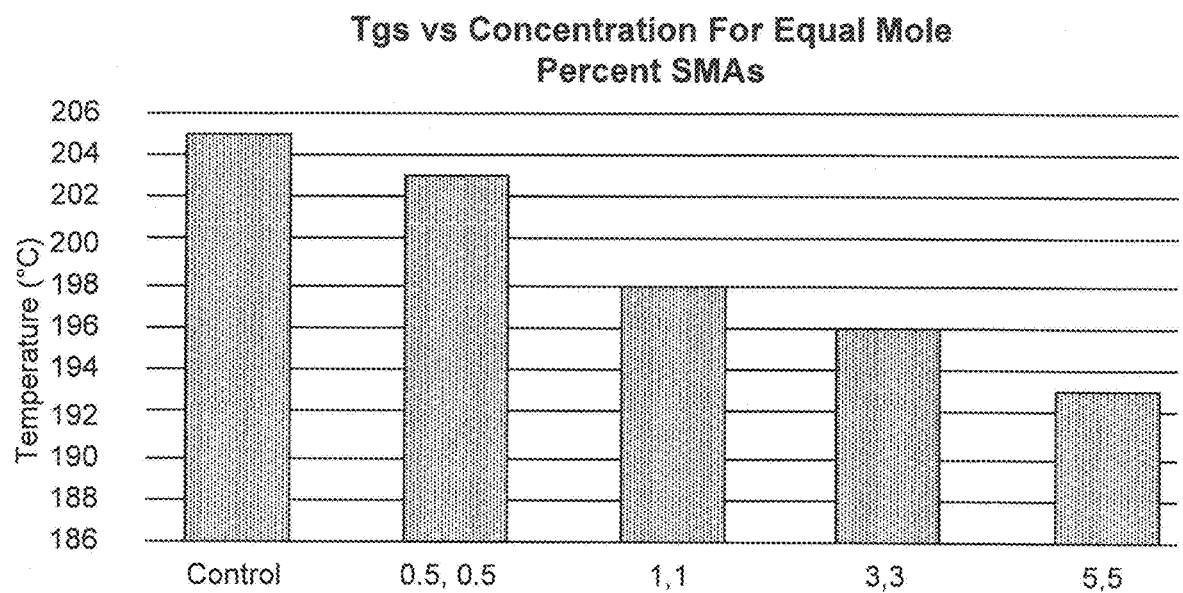
FIG. 3 is a graph of glass transition temperatures of copolyimides versus concentration for equal mole percent SMAs.

Copolyimide formation was confirmed using ATR-IR. Bands that correspond with functional groups associated with copolyimides were observed at 1778 and 1725 cm$^{-1}$. The band that represents amide acid normally found at 1546 cm$^{-1}$ were absent further supporting that imidization had occurred. DSC tests were run to determine glass transition temperatures ($T_g$) which are listed in Tables 1 and 2. Tg's are shown graphically in FIG. 3 and a downward trend is present as mole percent of SMAs increases. This trend was expected and was a good sign since added molecular flexibility from the SMAs would be expected to lower the Tg. This lowering of Tg as mole percent SMA increases was another indicator that SMAs were successfully incorporated into the copolyimide matrix.

Contact angle goniometry was used to measure the effect multiple SMAs had on copolyimide surface properties specifically, surface energy. Average water contact angle and surface energy mean for each sample are listed in Table 1.

Figure 4:
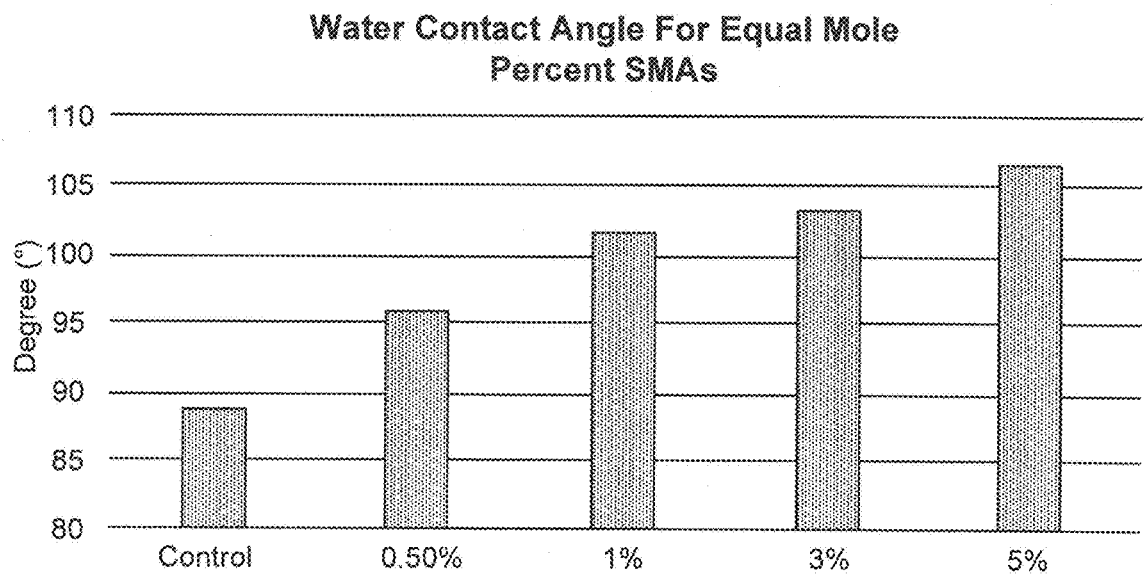
FIG. 4 is a graph of average water contact angles for copolyimides with increasing mole percent of SMAs.
Figure 5:
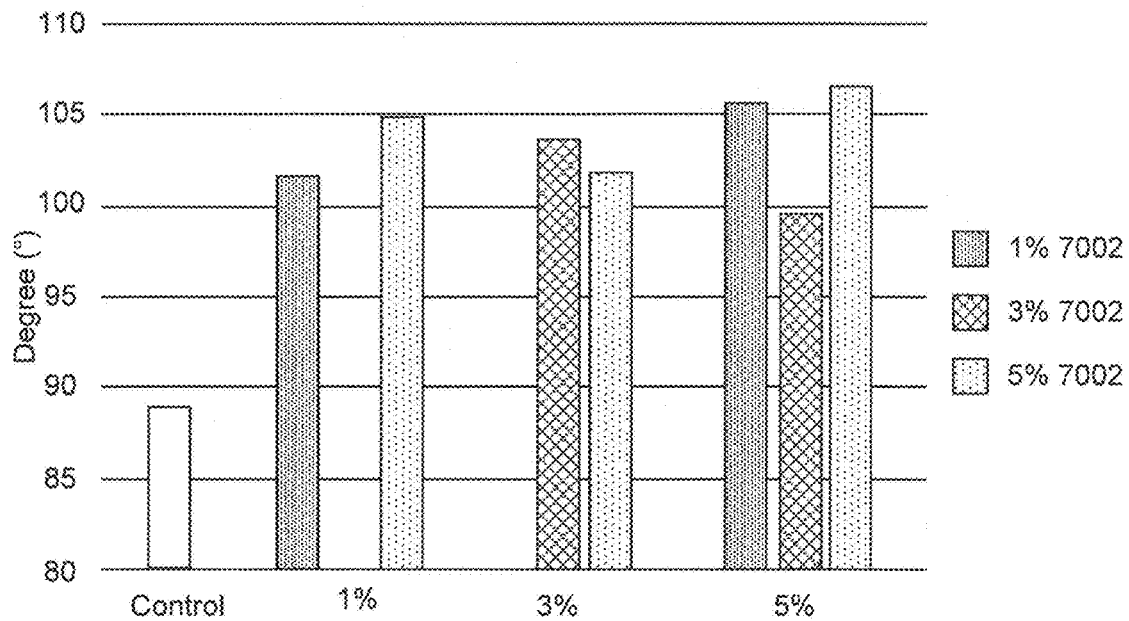
FIG. 5 is a graph of water contact angle by mole percent AEFO.
Figure 6:
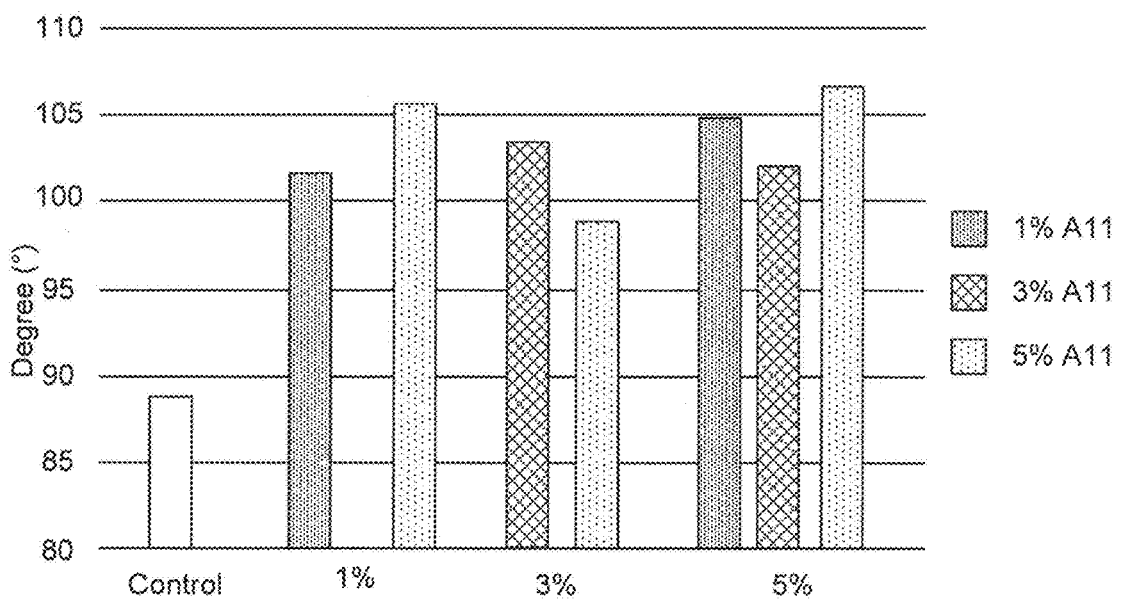
FIG. 6 is a graph of water contact angle by mole percent DMS.

Shown graphically in FIG. 4, the average water contact angle increases as mole percent of SMA increases. This trend observed in the data is a desirable one since increasing average water contact angle is an indication that surface properties are changing, specifically, surface energy is decreasing. This assumption is confirmed by the surface energy means listed in Table 1. FIGS. 5 and 6 show the effect increasing percentages of either fluorine or silicon SMAs have on average water contact angle. No significant trends are found in either of these graphs however it appears that the fluorine based SMA may tend to have a slightly greater effect on contact angle. Thus, in this series of experiments, copolyimides with a range of surface energies were prepared according to the various embodiments using two surface modifying agents and characterized using contact angle goniometry, differential scanning calorimetry (DSC), fourier transform infrared spectroscopy (FTIR), and thermograyimetric analysis (TGA) to measure chemical, surface, and thermal properties. The various embodiment materials exhibited a unique combination of physical, mechanical, thermal, and surface properties. Results indicate that the various embodiment materials exhibit favorable abhesion properties based on water contact angle and surface energy measurements.

Additionally, a series of embodiment copoly(amide acid)s was prepared and evaluated, as discussed below.

To emulate flight conditions under which insect impact events occur, controlled fruit fly impact studies were conducted inside a benchtop wind tunnel. An insect delivery device was utilized to propel the fruit fly at velocities representative of aircraft takeoff speeds. Testing was conducted using a custom-built pneumatic insect delivery device constructed from a VACCON HIGHVAC HVP series 300-Venturi vacuum pump that was modified with an extended delivery nozzle to enable accurate positioning of the insect impact site. Testing was conducted at ambient temperature (approximately 25° C.) and about 50-60% relative humidity. For each event, the airflow was turned on prior to feeding the insect into the insertion port. The suction force rapidly propelled the insect from the delivery port for impact on the test surface. High-speed photography was obtained during impact events using a Vision Research Phantom 12 camera at a speed of 50,000 frames per second.

Velocity measurements were obtained from high-speed photography of the insect trajectory against a 6 cm grid with 0.5 cm graduations. The air pressure was approximately 0.12 MPa. High-speed photography was obtained, as described above. Insect velocities were determined by dividing the distance by the time, determined from the frame count, required for the insect to traverse the set distance. The velocities were determined to be 234±29 kph; well above that requisite for rupture of a fruit fly exoskeleton, approximately 50 kph.

Insect residue heights were characterized using a FRT of America optical surface profilometer (Microprof 100). Data were collected over the entire region containing visible insect residues at a resolution of 5 μm between data points and 40 μm line to line. Several processing steps were performed on the collected topographical data including: segmentation to remove false zero readings, fitting the baseline to a second-order polynomial, and masking any edge and surface defects. Areal coverage was determined using grain analysis that identified and summed all features above the lowest permissible data plane, typically 8-15 μm, as individual grains. The data plane threshold above the established baseline was necessary to sufficiently separate insect residue features from substrate anomalies.

Example 1

Synthesis of Copoly(Amide Acid)s

A series of embodiment copoly(amide acid)s was prepared using the following general procedure: 1) The diamine-terminated fluorinated alkyl ether oligomer, the diamino terminated siloxane oligomer, the dianhydride and the diamine were placed into a round bottom flask equipped with a mechanical stirrer, and a gas inlet and outlet, and N,N-dimethylacetamide was added provide an oligomer solution with a concentration ranging from 10-30% solids; 2) the solution was stirred at ambient temperature (about 22° C.) for about 16 hours under an inert gas atmosphere. The solution contains copoly(amide acid). Tables 1 and 2 summarize the random copolymers compositions and preliminary characterization results. Table 1 shows the composition and characterization of 6FDA containing polymers and copolymers. In the experiments described by Table 1, 6FDA represents 4,4'-(hexafluoroisopropylidene)diphthalic anhydride. Table 2 shows the composition and characterization of BPDA containing polymers and copolymers. In the experiments described by Table 2, BPDA represents 3,3',4,4'-biphenyltetracarboxylic dianhydride. Representative AEFO and DMS structures as described in Tables 1 and 2 are illustrated in FIG. 2.

TABLE 1

| Designation | Stoichiometric Composition, Mole % | $\eta_{inh}$, dL/g | Tg, C. |
|---|---|---|---|
| 6FDA Control | 6FDA and APB | 0.43 | 204 |
| 6FDA-1 | 5% AEFO, 5% DMS | 0.31 | 185 |
| 6FDA-2 | 1% AEFO, 1% DMS | 0.18 | 197 |
| 6FDA-3 | 3% AEFO, 3% DMS | 0.25 | 190 |
| 6FDA-4 | 5% AEFO, 1% DMS | 0.25 | 190 |
| 6FDA-5 | 1% AEFO, 5% DMS | 0.29 | 189 |
| 6FDA-6 | 5% AEFO, 3% DMS | 0.20 | 191 |
| 6FDA-7 | 3% AEFO, 5% DMS | 0.32 | 186 |
| 6FDA-8 | 0.5% AEFO, 0.5% DMS | 0.24 | 201 |
| 6FDA-9 | 3% AEFO, 1% DMS | 0.31 | 189 |
| 6FDA-10 | 1% AEFO, 3% DMS | 0.19 | 191 |

TABLE 2

| Designation | Stoichiometric Composition, Mole % | $\eta_{inh}$, dL/g | Tg, C. |
|---|---|---|---|
| BPDA Control | BPDA and APB | 0.26 | 205 |
| BPDA-1 | 5% AEFO, 5% DMS | 0.32 | 193 |
| BPDA-2 | 1% AEFO, 1% DMS | 0.25 | 198 |
| BPDA-3 | 3% AEFO, 3% DMS | 0.27 | 196 |
| BPDA-4 | 1% AEFO, 5% DMS | 0.19 | 197 |
| BPDA-5 | 3% AEFO, 5% DMS | 0.33 | 189 |
| BPDA-6 | 5% AEFO, 1% DMS | 0.40 | 196 |
| BPDA-7 | 5% AEFO, 3% DMS | 0.44 | 194 |
| BPDA-8 | 0.5% AEFO, 0.5% DMS | 0.33 | 203 |
| BPDA-9 | 3% AEFO, 1% DMS | 0.30 | 202 |
| BPDA-10 | 1% AEFO, 3% DMS | 0.26 | 200 |

Example 2

Imidization to Copolyimides

Imidization of the polymer material was performed using the following general procedure. Samples of each solution made in Example 1 were centrifuged to remove gas bubbles. A film was cast from each sample using a doctor blade to an approximate thickness of about 500 to about 750 microns on a stainless steel plate and each film is placed in a forced air drying chamber at room temperature for about 24 to about 48 hours to remove solvent and provide a tack-free surface. Some of the films were then thermally imidized under nitrogen using a cure cycle with stages at 150° C., 175° C., 200° C. and 250° C. with a minimum hold of 40 minutes at each stage. Imidization was confirmed by FTIR.

Some of the copoly(amide acid) solutions were chemically imidized by reaction with acetic anhydride and pyridine. In this procedure, 33.02 grams of a 10 mass percent solids copoly(amide acid) dimethylacetamide solution was poured into a 100 milliliter 3-necked round bottomed flask. Then 3.9 milliliters of pyridine and 3.3 milliliters of acetic anhydride were added to the flask and the reaction mixture is mechanically stirred overnight under an inert atmosphere. After about 16 hours the reaction mixture was poured into a blender containing water resulting in precipitation of the chemically imidized copolyimide product. The copolyimide was filtered, stirred in hot water for several hours, filtered again and allowed to dry.

Example 3

Evaluation of Copolyimides

The cast and imidized coatings were evaluated for various characteristics and performance properties.

Contact angle goniometry (CAG) was utilized to characterize the surface properties of the copolymers. Contact angle measurements were collected using water, ethylene glycol and diiodomethane on both the air and steel plate sides of the copolymer films. Surface characterization results are presented in Tables 4 and 5. Table 4 shows the surface characterization of 6FDA copolyimides. In the experiments described by Table 4, 6FDA represents 4,4'-(hexafluoroisopropylidene)diphthalic anhydride. Table 5 shows the surface characterization of BPDA copolyimides. In the experiments described by Table 5, BPDA represents 3,3',4,4'-biphenyltetracarboxylic dianhydride. Representative AEFO and DMS structures as described in Tables 3 and 4 are illustrated in FIG. 2.

TABLE 3

| Designation | Stoichiometric Composition, Mole % | Advancing Water Contact Angle, θ | | Surface Energy, mJ/m² | |
|---|---|---|---|---|---|
| | | Air Side | Plate Side | Air Side | Plate Side |
| 6FDA Control | 6FDA and APB | 94 | 97 | 24.3 | 21.7 |
| 6FDA-1 | 5% AEFO, 5% DMS | 108 | 102 | 13.5 | 15.9 |
| 6FDA-2 | 1% AEFO, 1% DMS | 106 | 105 | 21.1 | 13.9 |
| 6FDA-3 | 3% AEFO, 3% DMS | 106 | 106 | 17.8 | 12.1 |
| 6FDA-4 | 5% AEFO, 1% DMS | 106 | 111 | 19.8 | 14.1 |
| 6FDA-5 | 1% AEFO, 5% DMS | 98 | 105 | 20.0 | 12.6 |
| 6FDA-6 | 5% AEFO, 3% DMS | 104 | 112 | 22.3 | 14.5 |
| 6FDA-7 | 3% AEFO, 5% DMS | 106 | 103 | 17.8 | 13.7 |
| 6FDA-8 | 0.5% AEFO, 0.5% DMS | 99 | 92 | 23.6 | 23.9 |
| 6FDA-9 | 3% AEFO, 1% DMS | 105 | 112 | 21.2 | 14.4 |
| 6FDA-10 | 1% AEFO, 3% DMS | 104 | 107 | 22.2 | 17.6 |

TABLE 4

| Designation | Stoichiometric Composition, Mole % | Advancing Water Contact Angle, θ | | Surface Energy, mJ/m² | |
|---|---|---|---|---|---|
| | | Air Side | Plate Side | Air Side | Plate Side |
| BPDA Control | BPDA and APB | 89 | 90 | 22.7 | 20.5 |
| BPDA-1 | 5% AEFO, 5% DMS | 114 | 108 | 14.1 | 12.4 |
| BPDA-2 | 1% AEFO, 1% DMS | 103 | 92 | 13.5 | 18.7 |
| BPDA-3 | 3% AEFO, 3% DMS | 108 | 98 | 14.6 | 16.0 |
| BPDA-4 | 5% AEFO, 1% DMS | 106 | 94 | 20.8 | 17.6 |
| BPDA-5 | 1% AEFO, 5% DMS | 108 | 102 | 14.1 | 14.5 |
| BPDA-6 | 5% AEFO, 3% DMS | 93 | 120 | 17.3 | 10.7 |
| BPDA-7 | 3% AEFO, 5% DMS | 109 | 112 | 15.8 | 11.4 |
| BPDA-8 | 0.5% AEFO, 0.5% DMS | 105 | 117 | 18.2 | 12.0 |
| BPDA-9 | 3% AEFO, 1% DMS | 103 | 109 | 15.1 | 12.3 |
| BPDA-10 | 1% AEFO, 3% DMS | 100 | 94 | 17.1 | 19.6 |

The water contact angles for all of the copolymers were higher than those of the control. Likewise, the surface energies were lower for the copolyimide films than the control. The advancing and receding contact angles were also measured on both sides of the film samples by titling the machine axis to 60 degrees after measuring the sessile drop angle. In nearly all cases for the 6FDA samples the steel plate side of the films exhibited lower surface energies than the air side. This observation correlates with the fluorine concentration being slightly higher on the steel plate side (as described with reference to EDS). For the BPDA based films, most exhibited lower surface energies on the steel plate side as well. These results indicate that the SMAs affect the surface properties on both sides of the films.

Energy-Dispersive X-Ray Spectroscopy

Select samples were investigated using HR-SEM/EDS in order to determine the surface fluorine and silicone content as well as the presence of phase segregation. EDS elemental data was quantified but not calibrated against any known standards. All experiments were carried out under exactly the same conditions, thus the relative changes can be viewed as semi-quantitative. Analyses were conducted on both the air side and steel plate side of the film samples. The surface elemental analysis as measured by EDS for select films are presented in Table 5. In the experiments described by Table 5, 6FDA represents 4,4'-(hexafluoroisopropylidene)diphthalic anhydride and BPDA represents 3,3',4,4'-biphenyltetracarboxylic dianhydride. Representative AEFO and DMS structures as described in Table 5 are illustrated in FIG. 2. For the 6FDA based samples, the fluorine content was considerably higher than theoretical and evenly distributed on both sides of the film surfaces. The silicon distribution was also higher than theoretical with some variability in the relative amounts on the air and steel side surfaces. In contrast, the BPDA based samples had much less fluorine and more variability in concentration on the air and steel plate side surfaces. Also, the silicon content was generally higher compared to the 6FDA samples, and exhibited more variability between the air side and steel plate side.

TABLE 5

| Sample (Ratio of AEFO to DMS) | Film Orientation | C, wt % | N, wt % | O, wt % | F, wt % | Si, wt % |
|---|---|---|---|---|---|---|
| 6FDA-3 (3:3) | Air | 21.40 | 6.30 | 23.04 | 44.34 | 4.91 |
| | Steel plate | 21.34 | 6.24 | 23.63 | 45.06 | 3.74 |
| 6FDA-5 (1:5) | Air | 22.19 | 5.71 | 23.03 | 42.60 | 6.47 |
| | Steel plate | 22.14 | 5.57 | 23.53 | 44.40 | 4.35 |
| 6FDA-4 (5:1) | Air | 21.91 | 6.11 | 23.15 | 46.36 | 2.47 |
| | Steel plate | 21.50 | 6.41 | 22.98 | 46.66 | 2.44 |
| 6FDA-6 5:3) | Air | 22.76 | 5.50 | 22.84 | 45.30 | 3.61 |
| | Steel plate | 22.68 | 5.44 | 22.71 | 45.43 | 3.75 |
| 6FDA-7 (3:5) | Air | 22.02 | 5.28 | 22.44 | 44.45 | 5.82 |
| | Steel plate | 21.13 | 5.05 | 22.62 | 45.03 | 6.17 |
| BPDA-3 (3:3) | Air | 31.83 | 8.33 | 41.47 | 13.33 | 5.04 |
| | Steel plate | 30.96 | 7.90 | 38.27 | 16.14 | 6.74 |
| BPDA-5 (1:5) | Air | 31.94 | 8.63 | 42.98 | 9.11 | 7.33 |
| | Steel plate | 32.22 | 8.62 | 44.16 | 8.61 | 6.39 |
| BPDA-4 (5:1) | Air | 29.21 | 8.38 | 42.03 | 18.77 | 1.61 |
| | Steel plate | 26.15 | 5.98 | 30.59 | 35.05 | 2.23 |
| BPDA-7 (3:5) | Air | 29.64 | 7.95 | 35.91 | 15.60 | 5.15 |
| | Steel plate | 27.41 | 7.14 | 35.91 | 18.81 | 10.73 |
| BPDA-6 (5:3) | Air | 30.68 | 8.65 | 39.92 | 15.60 | 5.15 |
| | Steel plate | 25.55 | 5.82 | 27.53 | 36.02 | 5.08 |

Figure 7:
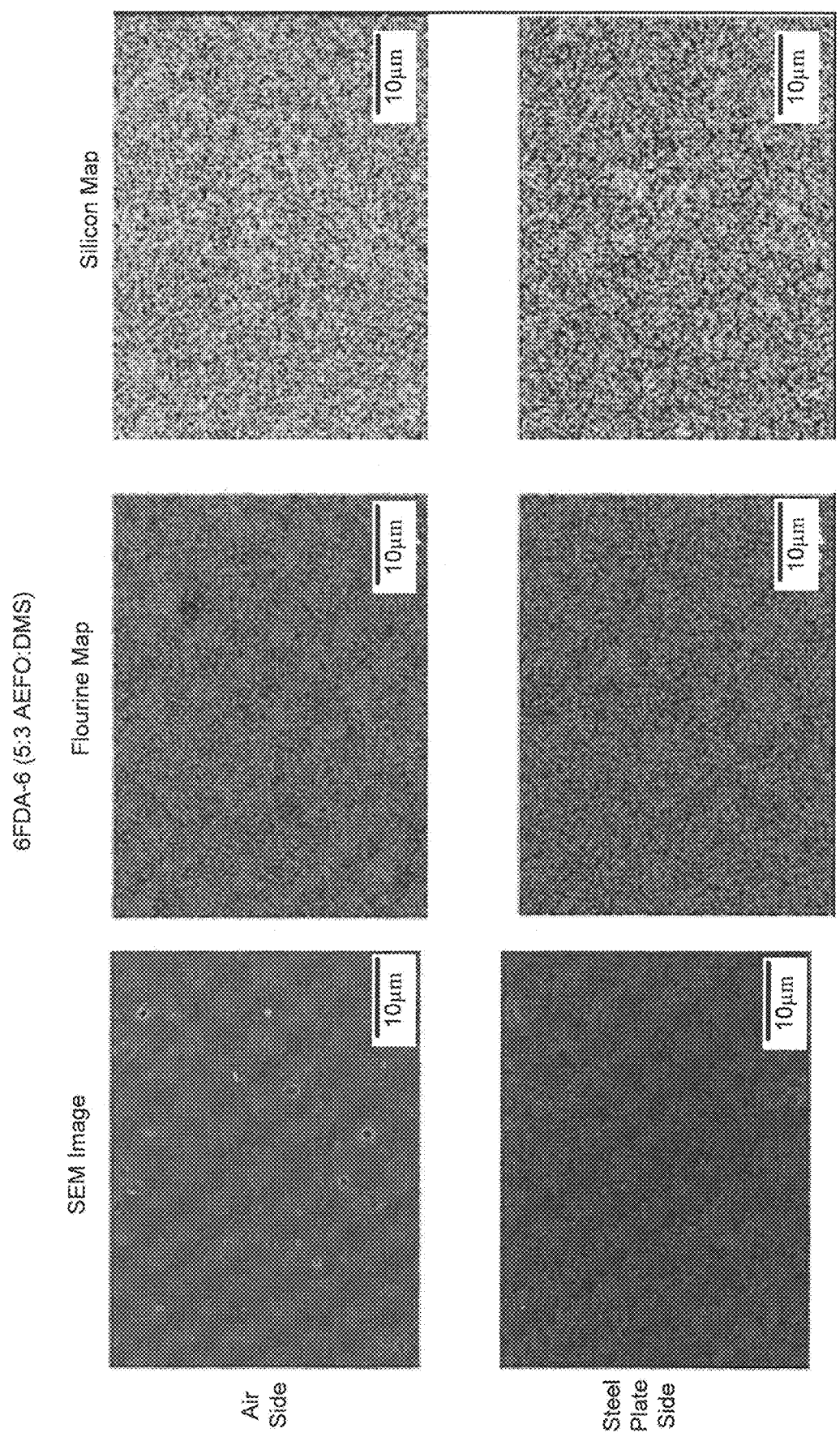
FIGS. 7-10 are elemental maps illustrating distributions of F and Si according to elemental mapping experiments conducted on embodiment copolyimides.
Figure 8:
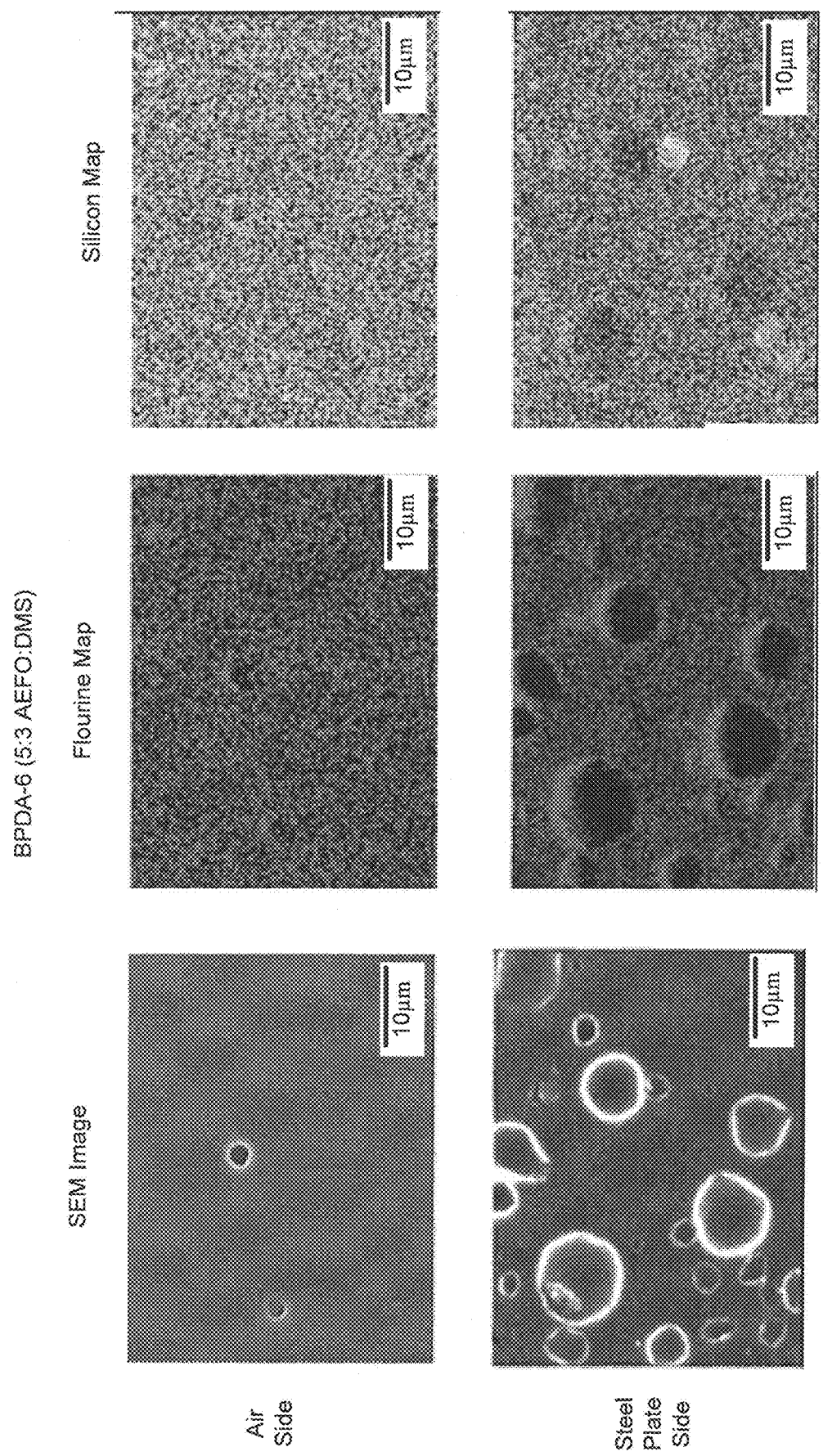
Figure 9:
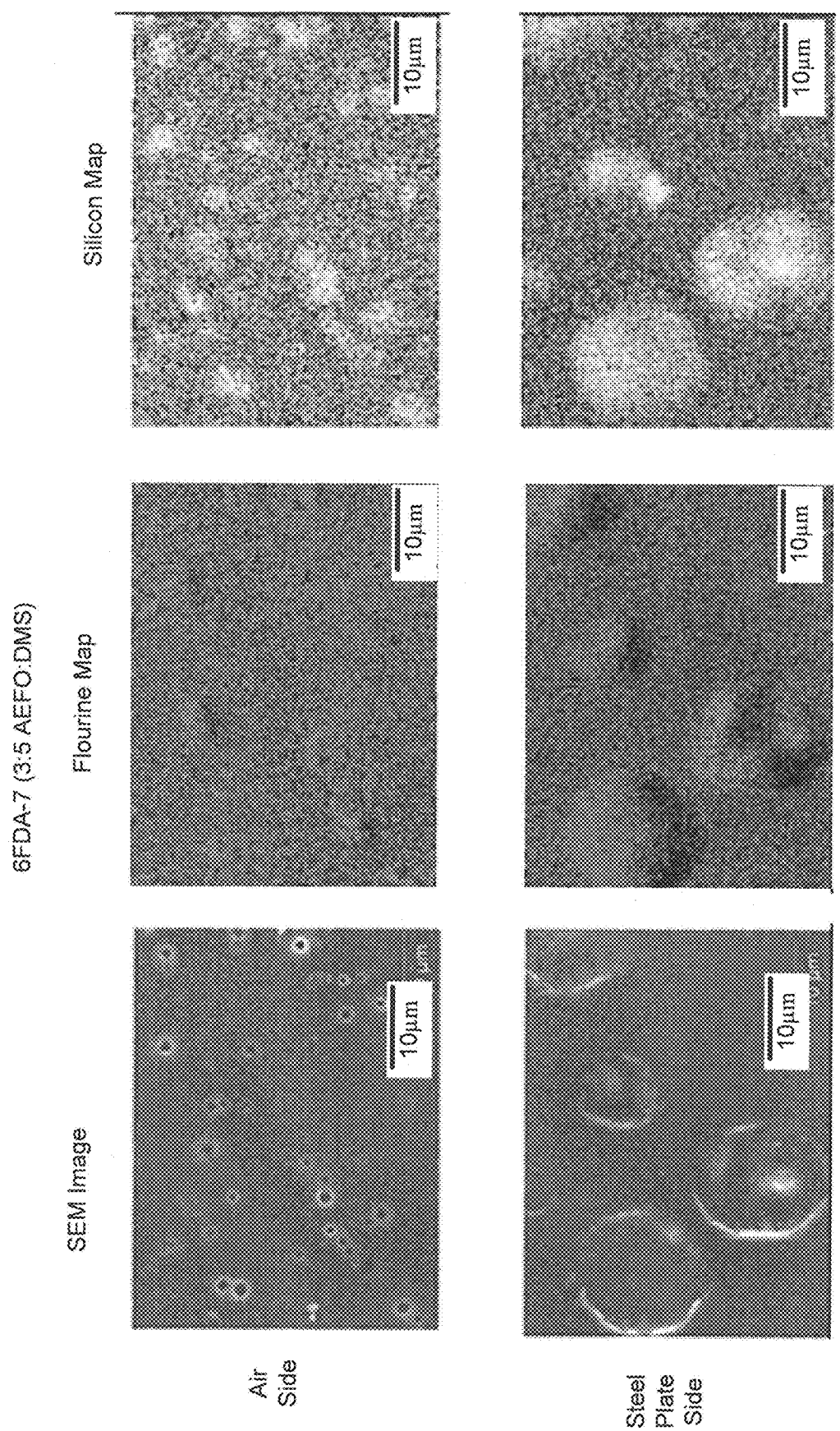
Figure 10:
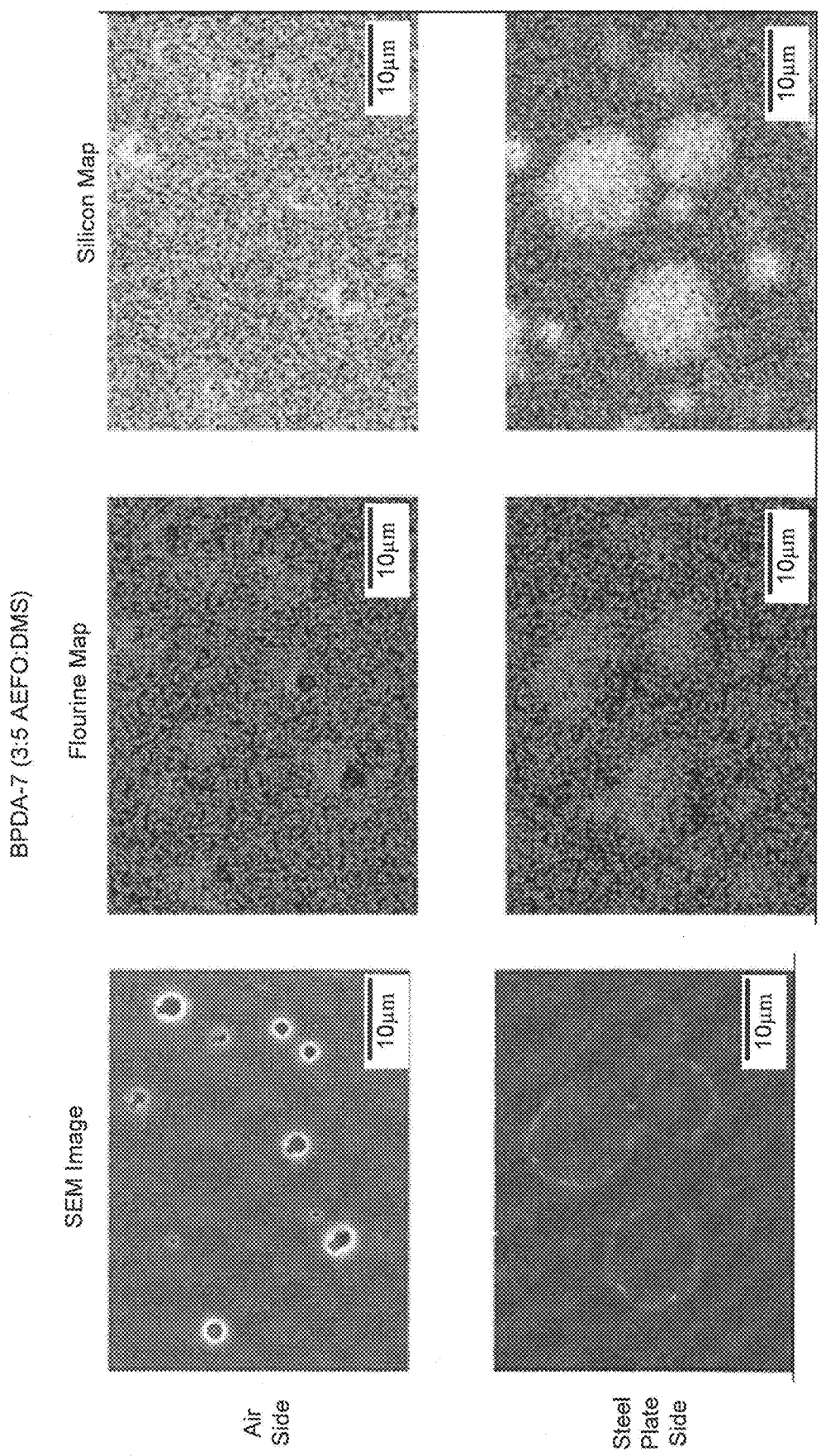

Elemental mapping experiments were conducted to further probe the sample morphology. FIG. 7 is an elemental map of 6FDA-6 showing even distributions of F and Si on both surfaces. FIG. 8 is an elemental map of BPDA-6 showing F enriched phases. FIG. 9 is an elemental map of 6FDA-7 showing Si enriched phases on both surfaces. FIG. 10 is an elemental map of BPDA-7 showing silicon enriched phases on both surfaces. In general, samples that contained low DMS (i.e. silicon) content relative to the AEFO (i.e. fluorine) content exhibited uniform silicon distribution (i.e. 6FDA-2, 4, and 9, BPDA-2, 4, and 9). Samples with higher AEFO content generally exhibited uniform distribution of Si as illustrated in FIG. 7. Interestingly, in comparing BPDA-6 with 6FDA-6 as illustrated in FIG. 7, the only compositional difference being in the dianhydride used, some phase segregation of the fluorine was observed as illustrated in FIG. 8. Samples with equivalent or higher content of DMS compared to the AEFO exhibited some degree of phase segregation with silicon enriched domains appearing on the air side predominately (i.e. 6FDA-3, 5 and BPDA-3, 5), and sometimes on both surfaces (6FDA-7 and BPDA-7, illustrated in FIGS. 9 and 10, respectively).

Insect Impact Tests.

Select samples were subjected to insect impact tests in a small scale wind tunnel. The film samples were mounted to a flat aluminum plate and impacted with flightless fruit flies under the conditions described in the experimental section. The impacts were recorded using high speed video to ensure the flies were whole prior to impact, and to help visualize the impact and subsequent release process. At least 3 impacts per sample were recorded and the remaining residues were subsequently characterized for height and aerial coverage using optical profilometry. The results are presented in Table 6. In nearly all cases, the embodiment copolyimides exhibited lower insect residue heights, and in many cases lower surface areas, than the either the Al or polyimide without SMAs control surfaces.

TABLE 6

| Sample, surface | Insect Residue Height, μm | Insect Residue Area, mm² |
|---|---|---|
| Control (Al Surface) | 203 | 1.10 |
| 6FDA Control (no SMAs), Air Side | 243 | 3.50 |
| 6FDA-1, Air Side | 121 | 1.4 |
| 6FDA-2, Air side | 189 | 0.57 |
| 6FDA-3, Air Side | 177 | 2.76 |
| 6FDA-6, Air side | 114 | 0.69 |
| 6FDA-8, Air side | 92 | 0.85 |
| 6FDA-9, Air side | 112 | 0.62 |
| 6FDA-10, Air side | 203 | 1.10 |
| BPDA-1 Plate Side | 118 | 0.45 |
| BPDA-2, Air side | 193 | 0.75 |
| BPDA-3, Air side | 180 | 0.64 |
| BPDA-4, Air Side | 67 | 0.30 |
| BPDA-5, Air side | 153 | 1.04 |
| BPDA-6, Air side | 176 | 0.49 |
| BPDA-7, Air side | 153 | 1.05 |
| BPDA-8, Plate side | 154 | 0.57 |
| BPDA-8, Air side | 123 | 0.19 |
| BPDA-9, Air side | 132 | 1.07 |
| BPDA-10, Air side | 92 | 0.29 |

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." As used herein, the term "and/or" includes any and all combinations of one or more of the associated listed items. As also used herein, the term "combinations thereof" includes combinations having at least one of the associated listed items, wherein the combination can further include additional, like non-listed items. Further, the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

Reference throughout the specification to "another embodiment", "an embodiment", "exemplary embodiments", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments and are not limited to the specific combination in which they are discussed.

What is claimed is:

1. A copolyimide containing fluorine and silicon oligomer, comprising a reaction product of:
   at least one aliphatic dianhydride or aromatic dianhydride:
   at least one aliphatic diamine or aromatic diamine;
   AEFO is of the formula:

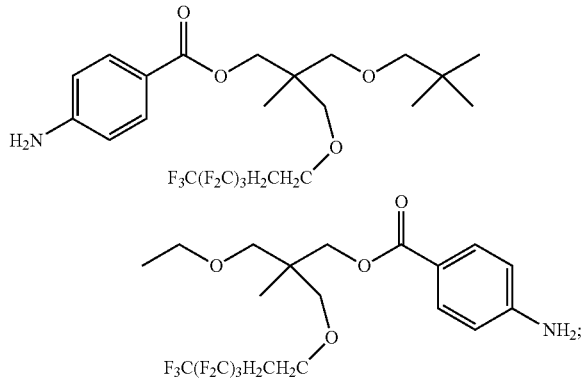

and
   aminopropyl terminated polydimethoxysilane (DMS), wherein the molar ratio of AEFO to DMS is 1:5 to 5:1.

2. The copolyimide of claim 1, wherein:
   the amount of AEFO and DMS together in the copolyimide is less than 15 mass perceny of the copolyimide.

3. The copolyimide of claim 1, wherein the amount of AEFO and DMS together in the copolyimide is less than about 1 mass percent of the copolyimide.

4. The copolyimide of claim 1, wherein the amount of AEFO and DMS together in the copolyimide is between about 0.0001 and about 0.1 mass percent of the copolyimide.

5. The copolymide of claim 1, wherein the at least one aliphatic dianhydride or aromatic dianhydride is of the formula:

$$O(C(O))_2\text{—L—}(C(O))_2O,$$

wherein L is an aliphatic or aromatic hydrocarbyl containing moiety of 2 to 100 carbon atoms.

6. The copolyimide of claim 1, wherein the at least one aliphatic diamine or aromatic diamine has the formula:

$$\text{—NH—Z—NH—}$$

wherein Z is an aliphatic or aromatic hydrocarbyl containing moiety of 1 to 100 carbon atoms.

7. The copolyimide of claim 6, wherein:
   the at least one aliphatic dianhydride or aromatic dianhydride is of the formula:

$$O(C(O))_2\text{—L—}(C(O))_2O,$$

wherein L is an aliphatic or aromatic hydrocarbyl containing moiety of 2 to 100 carbon atoms; and
L and Z comprise divalent radicals selected from the group consisting of oxygen, silyl, sulfur, carbonyl, sulfonyl, phosphonyl, perfluoro, tertiary amino, and amido, and wherein substitution of the anhydride groups relative to one another is selected from the group consisting of symmetric substitution, asymmetric substitution, and combined symmetric and asymmetric substitution.

8. The copolyimide of claim 6, wherein AEFO and DMS are reacted under condensation polymerization conditions to produce a precursor copoly(amide acid).

9. The copolyimide of claim 8, wherein the precursor copoly(amide acid) is soluble in one or more of an organic solvent selected from the group consisting of dimethylacetamide, N-methyl-2-pyrrolidinone, acetone, methyl ethyl ketone (MEK), methyl propyl ketone (MPK), methyl amyl ketone (MAK), tetrahydrofuran, and mixtures thereof.

10. The copolyimide of claim 9, wherein the precursor copoly(amide acid) is applied as a coating to a surface and then subjected to imidization conditions to form the copolyimide.

11. The copolyimide of claim 10, wherein the precursor imidization conditions are, selected from the group consisting of a thermal ring closure at a temperature in a range of about 120° C. to about 400° C., and a chemical ring closure in the presence of a dehydrating agent and ring-closing catalyst at a temperature in a range of about −20° C. to about 200° C.

12. The copolyimide of claim 1, wherein the at least one aliphatic dianhydride or aromatic dianhydride is 3,3',4,4'-biphenyl tetracarboxylic dianhydride (BPDA).

13. The copolyimide of claim 1, wherein the at least one aliphatic diamine or aromatic diamine is 1,3-bis (3-aminophenoxy) benzene (1,3-APB).

14. The copolyimide of claim 1, wherein the at least one aliphatic dianhydride or aromatic dianhydride is 3,3'4,4'-biphenyl tetracarboxylic dianhydride (BPDA) and the at least one aliphatic diamine or aromatic diamine is 1,3-bis (3-aminophenoxy) benzene (1,3-APB).

15. A coated substrate, comprising:
    a substrate; and
    the copolyimide of claim 1.

16. The coated substrate of claim 15, wherein the coated substrate is a portion of an article configured such that a fluid, flows over the coated substrate.

17. The coated substrate of claim 16, wherein the fluid is water or air.

18. The coated substrate of claim 16, wherein the article is a car, a boat, an airplane, a submarine, a window, a spacecraft, or a submersible construction component.

* * * * *